Inventor
Harry D. Geyer
By Spencer Hardman & Fehr
Attorney

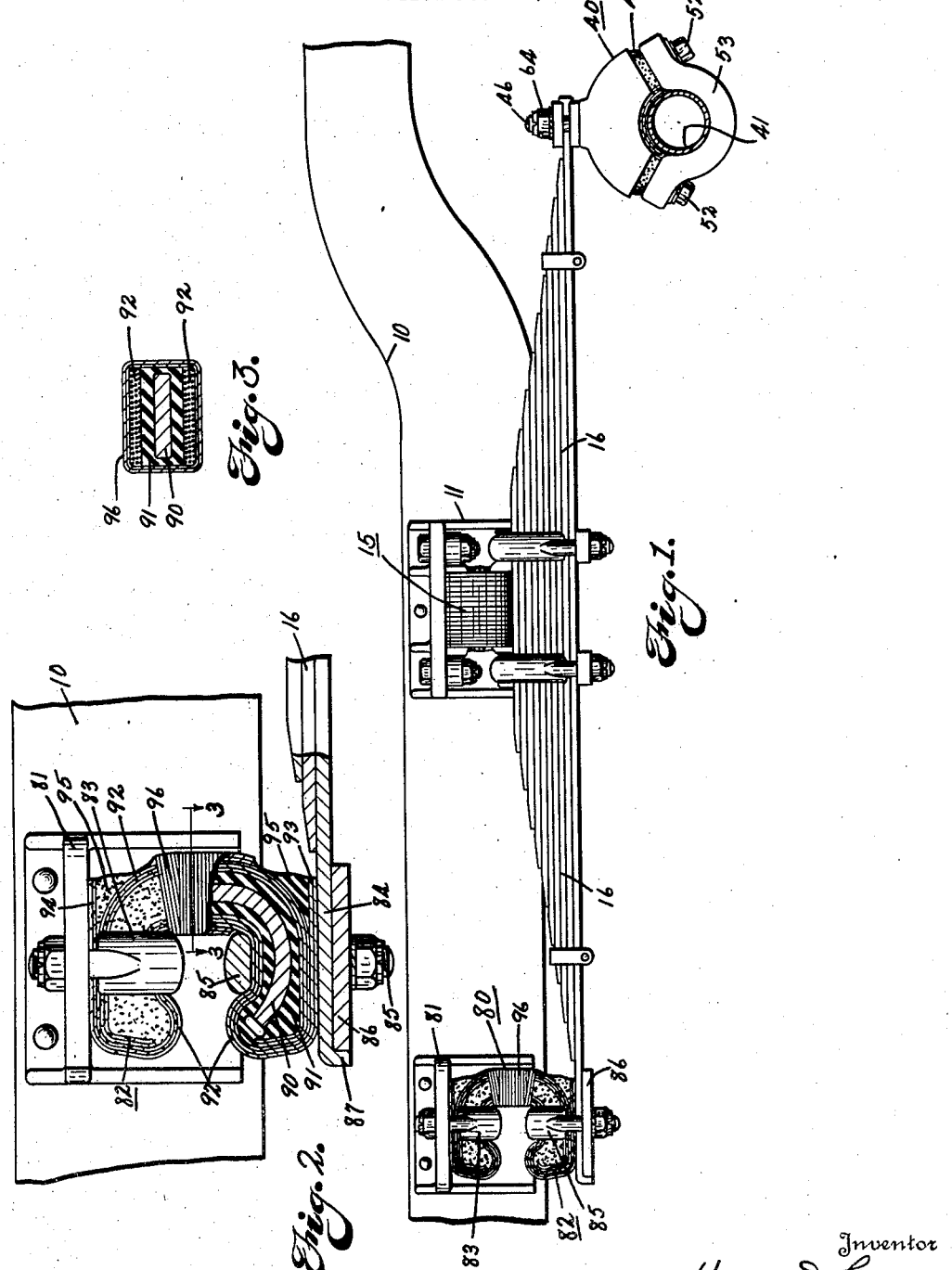
March 4, 1930.  H. D. GEYER  1,749,335
NONMETALLIC SHACKLE FOR CANTILEVER SPRING SUSPENSIONS
Filed Dec. 14, 1926    3 Sheets-Sheet 1
Inventor
Harvey D. Geyer
By Spencer Hardman & Fehr
Attorney March 4, 1930. H. D. GEYER 1,749,335
NONMETALLIC SHACKLE FOR CANTILEVER SPRING SUSPENSIONS
Filed Dec. 14, 1926 3 Sheets-Sheet 2

March 4, 1930.  H. D. GEYER  1,749,335
NONMETALLIC SHACKLE FOR CANTILEVER SPRING SUSPENSIONS
Filed Dec. 14, 1926  3 Sheets-Sheet 3

Inventor
Harvey D. Geyer
By Spencer Hardman & Fehr
Attorney

Patented Mar. 4, 1930

1,749,335

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

NONMETALLIC SHACKLE FOR CANTILEVER-SPRING SUSPENSIONS

Application filed December 14, 1926. Serial No. 154,810.

This invention relates to non-metallic elastic connections and supports operatively interposed between the cantilever spring of a motor vehicle and the axle and chassis frame.

An object of the invention is to provide an improved form of non-metallic connections between one end of the spring and the axle, between the other end of the spring and the chassis frame, and between the intermediate portion of the spring and the chassis frame, whereby the cantilever spring may operate in the conventional manner. The non-metallic connections at the three points referred to permit the proper relative movement between the spring and the parts connected thereby by distortion of the elastic material of the connections and hence no lubrication is necessary.

Further objects and advantages of the present invention will be apparent from the following description, reference being had to the accompanying drawings, wherein a preferred form of embodiment of the present invention is clearly shown.

In the drawings:

Fig. 1 is a side elevation of an automobile cantilever spring connecting the stationary rear axle to the chassis frame by means of non-metallic connections built according to this invention.

Fig. 2 is an enlarged side view of the extension shackle connecting the front end of the spring to the chassis frame, the lower part of the view showing a vertical section through the center line of the shackle.

Fig. 3 is a horizontal section on line 3—3 of Fig. 2.

Similar reference characters refer to similar parts throughout the several views.

Figure 7:
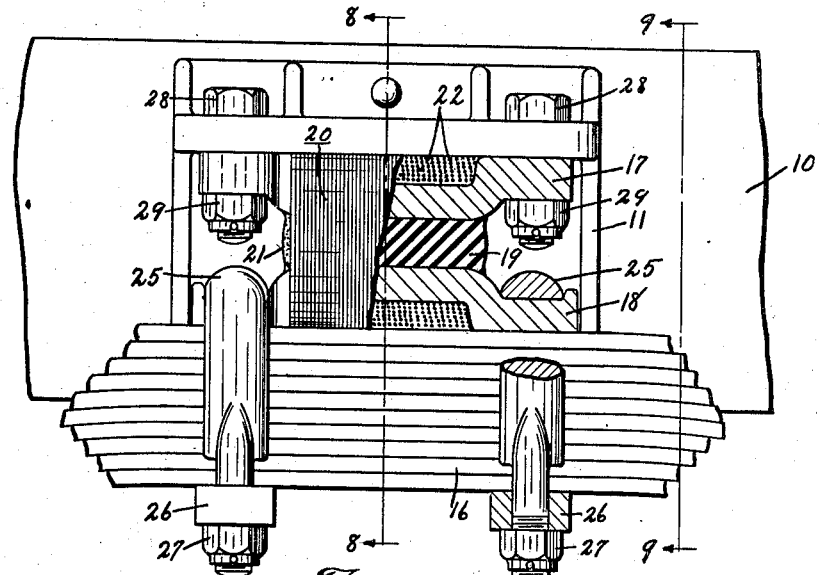
Fig. 7 is an enlarged detail view of the pivot connection between the central portion of the spring and the chassis frame, parts being broken away to show a vertical section on line 7—7 of Fig. 8.
Figures 8, 9:
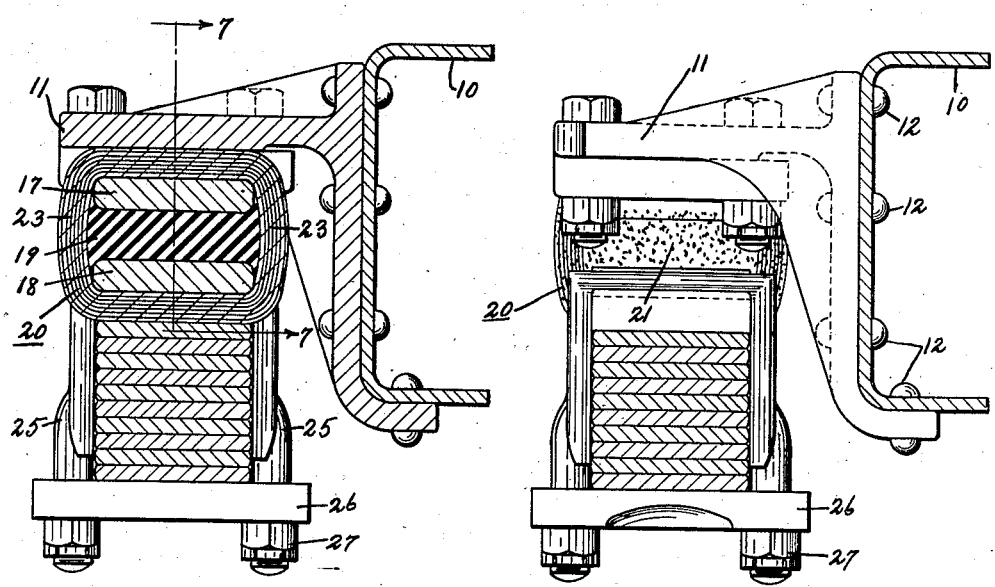
Fig. 8 is a section on line 8—8 of Fig. 7.
Fig. 9 is a view taken on line 9—9 of Fig. 7.

Numeral 10 designates the side rail of the chassis frame and 11 a bracket rigidly secured thereto by rivets 12. The connector, indicated as a whole by 15, yieldably connects the central portion of the leaf spring 16 to the bracket 11. This connector 15 comprises two metal clamping members 17 and 18 between which an elastic rubber block 19 is interposed. A plurality of layers of flexible rubberized cord fabric 20 is wrapped around on the outside of the clamping members 17 and 18 and the rubber block 19, as clearly shown in Figs. 7, 8, and 9, to form an outer fabric casing for the elastic rubber 19, however leaving the ends 21 of block 19 non-encased. Preferably these parts 17, 18, 19 and 20 are all vulcanized together in a suitable vulcanizing mold to form an integral molded unit, the metal members 17 and 18 being properly held positioned in the mold in a manner which will be obvious to those skilled in the art of vulcanizing rubber to metal inserts. The substantially non-extensible cords 22 of the cord fabric 20 preferably extend directly in the peripheral direction in which the fabric is wrapped, as clearly shown in Fig. 7. This molded element 15 is held rigidly fixed to the spring 16 by the two U-bolts 25 which loop over the projecting ends of the lower clamping member 18, by the cross clips 26 and nuts 27. By tightly setting up the nuts 27, the member 18 is caused to firmly clamp the fabric casing 20 down upon the top of spring 16 and at the same time the separate leaves of spring 16 are rigidly clamped together at their central portion. Element 15 is secured to the bracket 11 by the four through bolts 28 which extend through the projecting ends of the upper clamping member 17, as clearly shown. By tightly setting up the nuts 29, the member 17 is caused to firmly clamp the fabric casing 20 up against the bottom surface of the bracket 11. This fabric casing 20 is of such thickness that it will be properly compressed and firmly clamped in place by the members 17 and 18 when said members 17 and 18 seat upon the metal parts against which they are clamped.

In operation, this connector 15 sustains the weight of the car body by the compression of the elastic rubber block 19. When under such compression, block 19 is retained against excessive bulging along its lateral sides by the non-extensible flexible cord fabric casing 20. The uncased ends 21 of block 19 permit a slight amount of bulging of the elastic rubber at these points, which action facilitates the desired pivoting of the central portion of the cantilever spring relative to the side rail 10. During such small pivoting action permitted by this connector 15 the fabric casing 20 is always under tension due to the tendency of the elastic rubber 19 to flow out at the lateral edges thereof, and hence there is no tendency to break the vulcanized bond between the block 19 and the casing 20.

During rebound of the car body, that is, when the chassis frame tends to lift the rear axle and wheels, and connector 15 must sustain a tension load. At such times the tension load is taken by the fabric casing 20 which is made very strong in tension due to the cords 22 extending in the peripheral direction as described above. However at such times, the elastic rubber block 19 is still under compression due to being compressed laterally by the tendency of the lateral bulges 23 of casing 20 to straighten out under influence of the tension load thereupon. It is thus seen that, with all load conditions, the elastic block 19 is always under compression and the casing 20 is always under tension. Hence the elastic rubber is always being forced into tight contact with casing 20, and there is never any tendency to break the vulcanized bond between the elastic rubber and casing 20.

Figure 4:
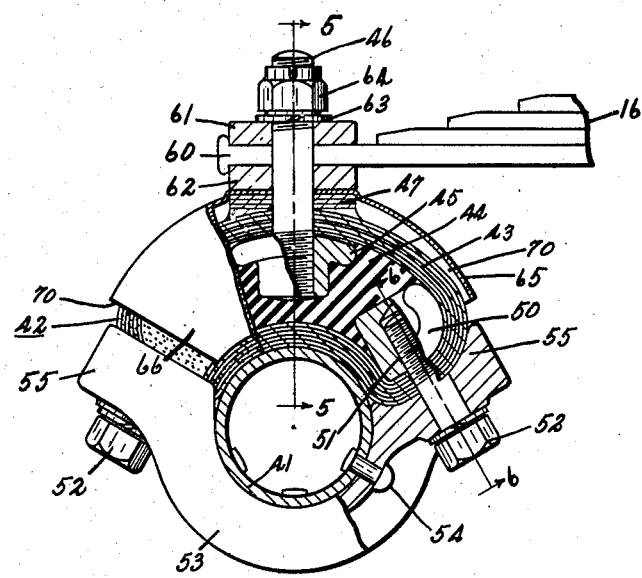
Fig. 4 is an enlarged detail view of the shackle connecting the rear end of the spring to the stationary rear axle, parts being broken away to show a vertical section on line 4—4 of Fig. 5.
Figures 5, 6:
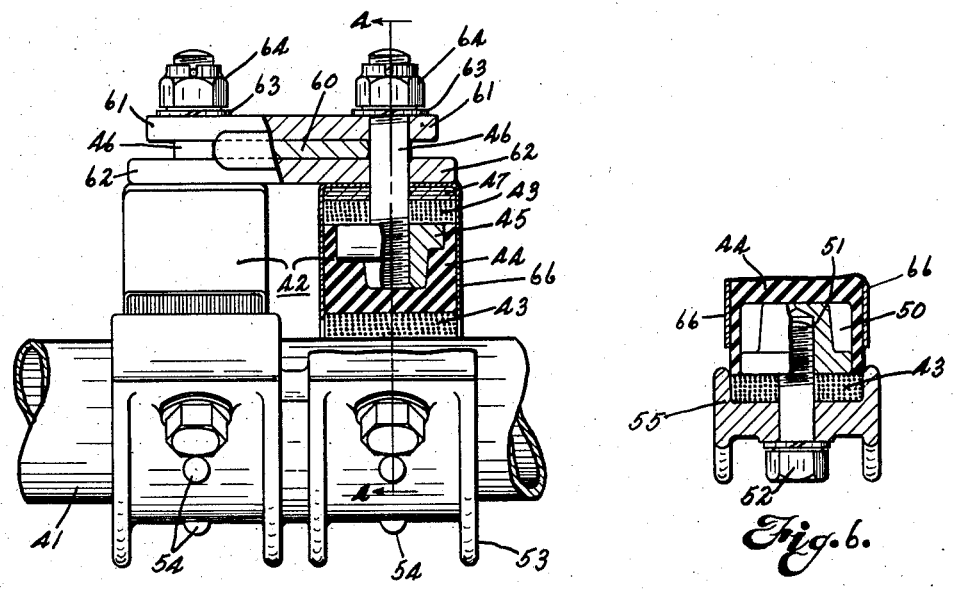
Fig. 5 is a rear end view of Fig. 4, parts being broken away to show a vertical section on line 5—5 of Fig. 4.
Fig. 6 is a section on line 6—6 of Fig. 4.

The connector, indicated as a whole by numeral 40, yieldably connects the rear end of spring 16 to the stationary rear axle 41. This connector 40 comprises two molded elements 42 each shaped as shown in Fig. 4 and having an endless rubberized cord fabric band 43 surrounding an interior of elastic rubber 44. The cords of band 43 extend peripherally as clearly shown in Figs. 4 and 5. The metal insert 45 is molded in place and is provided with a shank 46 extending through the fabric band 43 and through a rubberized fabric seat 47 which is molded in place on the top of the fabric band 43 as clearly shown in Fig. 4. Each molded element 42 is also provided with two molded in metal inserts 50, located as clearly shown in Fig. 4, and each provided with a threaded hole 51 adapted to receive the threaded ends of the bolts 52. The stationary axle 41 has the double fitting 53 rigidly fixed thereto by rivets 54. Fitting 53 has forwardly and rearwardly projecting seats 55 within which the fore and aft ends of the two molded elements 42 snugly fit and are held firmly clamped in place by the bolts 52 which extend through the fabric band 43 and are threaded into the metal inserts 50, as clearly shown in Figs. 4 and 6. It is obvious that by applying a wrench to the heads of bolts 52 the fabric band 43 is very tightly clamped in place between the inserts 50 and the seats 55 which are rigid with the axle 41.

Now the upper central portion of the fabric band 43 of both molded elements 42 is rigidly clamped to the end 60 of the long leaf of spring 16. This is accomplished without piercing the end 60 of the spring leaf by providing the upper and lower clamping plates 61 and 62 respectively. The two parallel shanks 46 of the two molded elements 42 extend through holes in plates 61 and 62 immediately adjacent the sides of the leaf 60, as clearly shown in Fig. 5, and are provided with suitable washers 63 and nuts 64. It is obvious that by setting up the nuts 64 very tight the upper central portion of the fabric bands 43 will be tightly clamped between the clamping inserts 45 and the lower clamping plate 62. Preferably each molded element is provided with a metallic housing 65 whose downwardly turned sides 66 snugly engage the lateral sides of the elastic rubber 44 and prevent excessive lateral bulging thereof when the same is put under compression. This housing 65 is held in place by being rigidly clamped between the fabric seat 47 of the molded element 42 and the lower clamping plate 62.

In operation, the weight of the car body is supported by compression of the elastic rubber 44 which is retained by the flexible fabric band 43 and the housing sides 66. During rebound of the car body the tension load on the molded elements 42 is taken by the flexible fabric band 43, as will be obvious from viewing Fig. 4. Under such tension loads the upper bulges of the flexible band 43 tend to straighten out thus compressing the elastic rubber 44. It is therefore seen that under both tension and compression loads the flexible band 43 is always under tension and the elastic rubber 44 is always under compression. Hence there is never any tendency to break the vulcanized bond between the band 43 and the elastic rubber 44 with a consequent destructive action on the molded element. This connector 40 permits a small pivotal movement of the spring 16 relative to the axle 41, such as is required in this type of cantilever spring suspension. The metal housing 65 is made to clear the seats 55 of fitting 53 and the axle 41 by a sufficient amount to avoid any metal to metal contact during such relative pivoting of spring 16 and axle 41 even when the molded element 42 is under its greatest compression load. The upper surface of the flexible fabric band 43 normally clears the metal housing 65 as shown at 70 in Fig. 4 so that the above described pivotal action may take place more easily. Instead of providing two separate molded elements 42, as illustrated and described above, it is obvious that a single similar molded element of such width as to give the proper strength may be used.

The connector, indicated as a whole by numeral 80, yieldably connects the front end of spring 16 to the side rail 10 of the chassis frame. A bracket 81 is rigidly fixed by rivets or otherwise to side rail 10. A C-shaped molded unit 82 is firmly clamped to bracket 81 by the U-bolt 83 and to the front end 84 of spring 16 by the U-bolt 85. The U-bolt 85 straddles the spring end 84 to avoid piercing the spring leaf, and the shanks of the U-bolt extend through holes in the bottom plate 86 which will therefore be rigidly clamped against the bottom side of the spring end 84. The tip of the spring end 84 is preferably turned down, as shown at 87, over the forward edge of plate 86 to prevent any possibility of the spring end working endwise from under the molded unit 82.

The molded unit 82 comprises a substantially C-shaped metal insert 90 embedded within the elastic rubber 91 and having a flexible fabric band 92 of several layers of rubberized cord fabric extending around the periphery of the elastic rubber 91. The substantially non-extensible cords of the flexible band 92 extend in a peripheral direction as clearly shown in Figs. 2 and 3. The fabric band 92 has two end portions 93 and 94 which serve as flat seats for contacting with the spring end 84 and bracket 81 respectively. The wedge-shaped spaces between these seat portions 93 and 94 are filled with soft elastic rubber 95 which yields to permit the swinging movement of the molded unit and also prevents mud, gravel, etc., from entering the wedge-shaped spaces occupied thereby. The central portion of the molded unit is preferably provided with a flexible rubberized fabric casing 96 wrapped in a transverse direction therearound. This casing 96 therefore completely encases the elastic rubber 91 over the central portion of the molded unit but leaves the lateral edges of the elastic rubber 91 at the end portions of the molded unit unencased.

In operation, the connector 80 permits the spring end 84 to move longitudinally relative to the bracket 81 by the molded unit 82 partaking of a swinging movement. The metal insert 90 pivots at each end portion thereof by internal distortion of the elastic rubber 91 within which it is embedded. During such pivoting the elastic rubber 91 may bulge outwardly at the lateral edges which are unencased, thereby providing easier pivoting of the curved ends of the insert 90. The fabric casing 92 is sufficiently flexible to easily permit this swinging movement of the central portion of the molded unit while the end portions thereof are firmly clamped in place to the spring end 84 and bracket 81. It will be obvious from the illustration in the drawings that the connector 80 is capable of sustaining both tension and compression loads and that in both cases the elastic rubber 91 is under compression. Thus the elastic rubber is always forced against the fabric casing 92 and there is no tendency to break the vulcanized bond between the casing and elastic rubber.

While the form of embodiment of the present invention as herein disclosed, constitutes a preferred form, it is to be understood that other forms might be adopted, all coming within the scope of the claims which follow.

What is claimed is as follows:

1. In combination with a cantilever spring and rear axle of a motor vehicle, a shackle comprising: a metal housing fixed to said spring, a molded elastic rubber element partially confined by said housing and sustaining the weight load by compression and having a flexible fabric link molded thereupon, said link being fixed at its fore and aft portions rigid with said axle, and means for securing the intermediate portion of said link to said spring.

2. In combination with a cantilever spring and rear axle of a motor vehicle, a shackle comprising: a molded elastic rubber element interposed between said spring and axle and sustaining the weight load by compression and having a flexible fabric link molded thereupon, said link being secured at its fore and aft portions rigid with said axle, and means for securing the intermediate portion of said link to said spring.

3. In a motor vehicle, in combination, an axle, a leaf spring positioned above said axle, a coupling connecting said spring and axle comprising: a molded elastic rubber element sustaining the weight load by compression, a flexible fabric link molded to said rubber element and having its fore and aft portions fixed rigid with said axle and having its intermediate portion fixed to said spring.

4. In a motor vehicle, in combination, an axle, a leaf spring positioned above said axle, a coupling connecting said spring and axle comprising: a molded element having an outer casing of flexible rubberized fabric and an interior of elastic rubber vulcanized thereto, said molded element having its lower portion fixed rigid with said axle and having its upper portion fixed rigid with said spring, whereby compression loads are taken by compressing said molded element and tension loads are taken by said outer fabric casing.

5. In a cantilever spring suspension for vehicles, an axle, a coupling between said axle and the spring end comprising: a metal housing fixed to the spring end, a molded element partially confined by said housing, said element having a flexible fabric casing and an interior of elastic rubber, means for fixing the fore and aft portions of said fabric casing rigid with said axle, and means for fixing the upper central portion of said fabric casing to the spring end.

In testimony whereof I hereto affix my signature.

HARVEY D. GEYER.